(12) United States Patent
Candelore

(10) Patent No.: US 8,056,103 B2
(45) Date of Patent: Nov. 8, 2011

(54) SYSTEM AND METHOD FOR TRANSCODING SIGNAL CONTENT

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1129 days.

(21) Appl. No.: 11/363,706

(22) Filed: Feb. 28, 2006

(65) Prior Publication Data

US 2007/0204286 A1    Aug. 30, 2007

(51) Int. Cl.
*H04N 7/18* (2006.01)
(52) U.S. Cl. .......... 725/78; 725/133; 725/134; 725/141; 709/217; 375/240
(58) Field of Classification Search .......... 725/4, 78–85, 725/131–134, 139–142; 709/217–232; 375/240
See application file for complete search history.

(56) References Cited

U.S. PATENT DOCUMENTS

| 7,738,550 B2 * | 6/2010 | Kuhn ...................... 375/240.01 |
| 2001/0047517 A1 * | 11/2001 | Christopoulos et al. ........ 725/87 |
| 2003/0135860 A1 * | 7/2003 | Dureau ........................... 725/82 |
| 2004/0181800 A1 * | 9/2004 | Rakib et al. ..................... 725/25 |
| 2005/0278755 A1 * | 12/2005 | Kuo et al. ....................... 725/80 |

FOREIGN PATENT DOCUMENTS

WO    WO 2005072389 A2 *    8/2005

* cited by examiner

*Primary Examiner* — Annan Shang
(74) *Attorney, Agent, or Firm* — Blakely, Sokoloff, Taylor & Zafman LLP

(57) ABSTRACT

In one embodiment, a method and system for receiving in a set-top-box a signal including a conditionally accessible content and encoded based on a first audio/video encoding standard (AVES); conditionally accessing the content of the signal in set-top-box based on predetermined access criteria; transmitting the content to a device external to the set-top-box; transcoding the content by the device from the first audio/video encoding standard to a second AVES; and providing the transcoded content to the set-top-box. In another embodiment, an apparatus including a set-top-box including a conditional accessing logic to access the content of a signal; and a set-top-box housing including an opening to allow interfacing between set-top-box and a transcoder system, the transcoder system to receive the content from the set-top-box via the opening, to transcode the content from a first AVES to a second AVES, and to provide the transcoded content to set-top-box via the opening.

20 Claims, 3 Drawing Sheets

SYSTEM AND METHOD FOR TRANSCODING SIGNAL CONTENT

FIELD

Embodiments of the invention relate to signal processing, and more particularly to the transcoding of the content of a signal.

BACKGROUND

Transmitting of data from a content provider to subscribers in a protected format, such as radio and television programs transmitted in encrypted or scrambled form from a television or radio station via cable or satellite, is in widespread use today. Generally, the protected data has to be decoded at the receiving station, such as a cable or satellite set-top-box, prior to its display or playback to a user. One form of such decoding is performed via the insertion of a cable or satellite card into an open slot of the set-top-box. The inserted card includes one or more access keys which can be used to decode the protected data so that its content can be retrieved for viewing or listening.

A growing problem in the foregoing approach is an increasing number of proposed and legacy audio-video (AV) encoding standards. This increasing number of AV encoding standards will likely create compatibility problems for a given set-top-box, which needs to accommodate AV encoding of programs transmitted by the content provider and AV decoding of such programs for display by a viewer's television. For example, the content provider may use an encoding standard of Motion Picture Expert Group 4 (MPEG 4), while the set-top box is adapted to decompress content formatted in accordance with an MPEG 2 standard.

Currently, an externally inserted cable or satellite card would be used to perform both the decoding of the received program and the transcoding of the received program from one encoding standard to another, such as from MPEG 4 to MPEG 2. Due to the relative expense of providing the viewers with externally inserted cable and satellite cards, however, makers of set-top-box are in the process of incorporating the card's functionality into the set-top-box. While this approach may prove effective for the decoding functionality of the cable and satellite cards, it greatly reduces the programmability of a set-top box in accommodating different encoding standards through transcoding operations, so to be compatible with both formats of content delivered by the content provider and processed by the viewer's display device.

Accordingly, there will be a need for providing set-top-boxes which do not use traditional external cards for decoding a received program, but with the ability to transcode received programs into formats compatible with the display device on which the program is to be shown.

SUMMARY

In one embodiment, the invention can be regarded as a method for receiving in a set-top-box a signal including conditionally accessible content that is encoded based on a first audio/video encoding standard; conditionally accessing the content of the received signal in the set-top-box based on predetermined access criteria; transmitting the conditionally accessible content to a device external to the set-top-box; transcoding the conditionally accessible content by the device from the first audio/video encoding standard to a second audio/video encoding standard; and providing the transcoded content to the set-top-box.

In another embodiment, the invention can be regarded as a system including a set-top box to receive a signal including conditionally accessible content that is encoded based on a first audio/video encoding standard. The set-top box includes conditional access logic adapted to conditionally access the content of the received signal based on predetermined access criteria. The system further includes a transcoder system to receive the conditionally accessible content from the set-top box, to transcode the conditionally accessible content from the first audio/video encoding standard to a second audio/video encoding standard, and to provide the transcoded signal to the set-top box.

In yet another embodiment, the invention can be regarded as an apparatus including (i) a set-top box and (ii) a set-top box housing. The set-top box includes conditional access logic to conditionally access content of a received signal based on predetermined access criteria. The set-top box housing includes an opening to allow interfacing between the set-top box and a transcoder system, where the transcoder system receives the content from the set-top box via the opening, transcodes the content from a first audio/video encoding standard to a second audio/video encoding standard, and to provide the transcoded content to the set-top box via the opening.

BRIEF DESCRIPTION OF THE DRAWINGS

Embodiments of the invention may best be understood by referring to the following description and accompanying drawings that are used to illustrate various features of the embodiments of the invention.

DETAILED DESCRIPTION OF THE INVENTION

Embodiments of the invention generally relate to a system and method for transcoding conditionally accessed content of a signal. Herein, embodiments of the invention may be applicable to a variety of devices coupled at one end to a content playback device such as a television monitor for example, and at the other end to some external source from which a signal is received and decoded. The content of the decoded signal is played back on the content playback device. Examples of such devices include, but not limited or restricted to, a set-top box such as cable and satellite receiver box, wireless telephone, digital video recorder (DVRs) and the like.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the various embodiments of the invention. For example, the term "set-top box" describes a device that receives the stream of data from a signal source, such as a radio or television station in variety of ways: such as 1) via wireless transmission including satellite or even an ordinary Very High Frequency (VHF) or Ultra High Frequency (UHF) antennas; or 2) via wire-based transmissions, such as via an Ethernet or coaxial cable, digital subscriber line or even a telephone line. A set-top-box accesses the programming content in the received stream of data and outputs the accessed content for display or playback on a viewer's content playback device.

The term "software" generally denotes executable code such as an operating system, an application, an applet, a routine or even one or more instructions. The software may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), an optical disk (e.g., compact disk or digital versatile disc "DVD"), a hard drive disk, tape, or any kind of interconnect (defined below).

The term "conditional access" as used through the detailed description refers to the protection of content in the form of a signal, a file, or another format by requiring certain criteria to be met before granting access to the content. Examples of conditional access include but are not limited to encryption, scrambling, ciphering and compression for which a key may be required to gain access to the content of the encrypted, scrambled, ciphered or compressed signal. The term "encode" as well as other tenses of this term are generally used to describe a modification of the content, such as compression, scrambling, encryption, etc.

Figure 1:
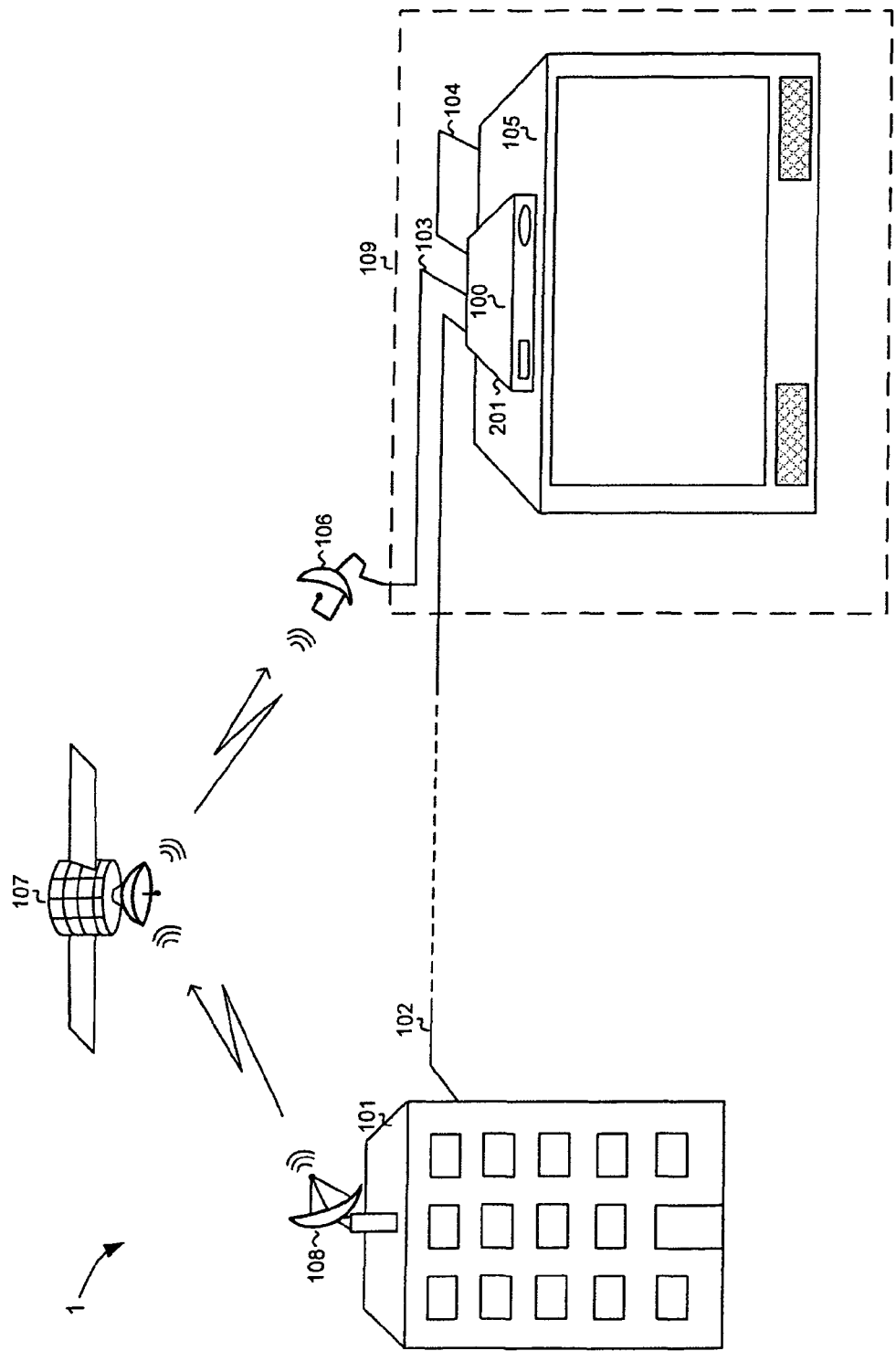
FIG. 1 illustrates an exemplary environment in which embodiments of the invention may be practiced.

With reference to FIG. 1, an exemplary environment 1 is shown in which embodiments of the invention may be practiced in the context of the set-top-box 100. As show in FIG. 1, the set-top-box 100, such as a satellite or cable box, at a user's location 109, such as a house, receives a stream of data containing programming content from a signal source 101, such as a content provider station. The set-top-box 100 might receive the stream of data from the signal source 101 in variety of ways, such as via wireless transmission 103 including satellite dish reciever 106 in communiction with the signal source 101 via a satellite 107 and satellite dish transmitter 108; or might receive the stream of data from a Very High Frequency (VHF) or Ultra High Frequency (UHF) antenna (not shown). The set-top-box 100 might also receive the stream of data from the signal source 101 via wire-based transmissions 102, such as via an Ethernet or coaxial cable, digital subscriber line or even a telephone line. As described in greater detail in conjunction with FIGS. 2-3, the set-top-box 100 accesses the programming content in the received stream of data and outputs the accessed content, such as via interconnect 104, for display or playback on a viewer's content playback device 105, such as a television, shown in FIG. 1.

Figure 2:
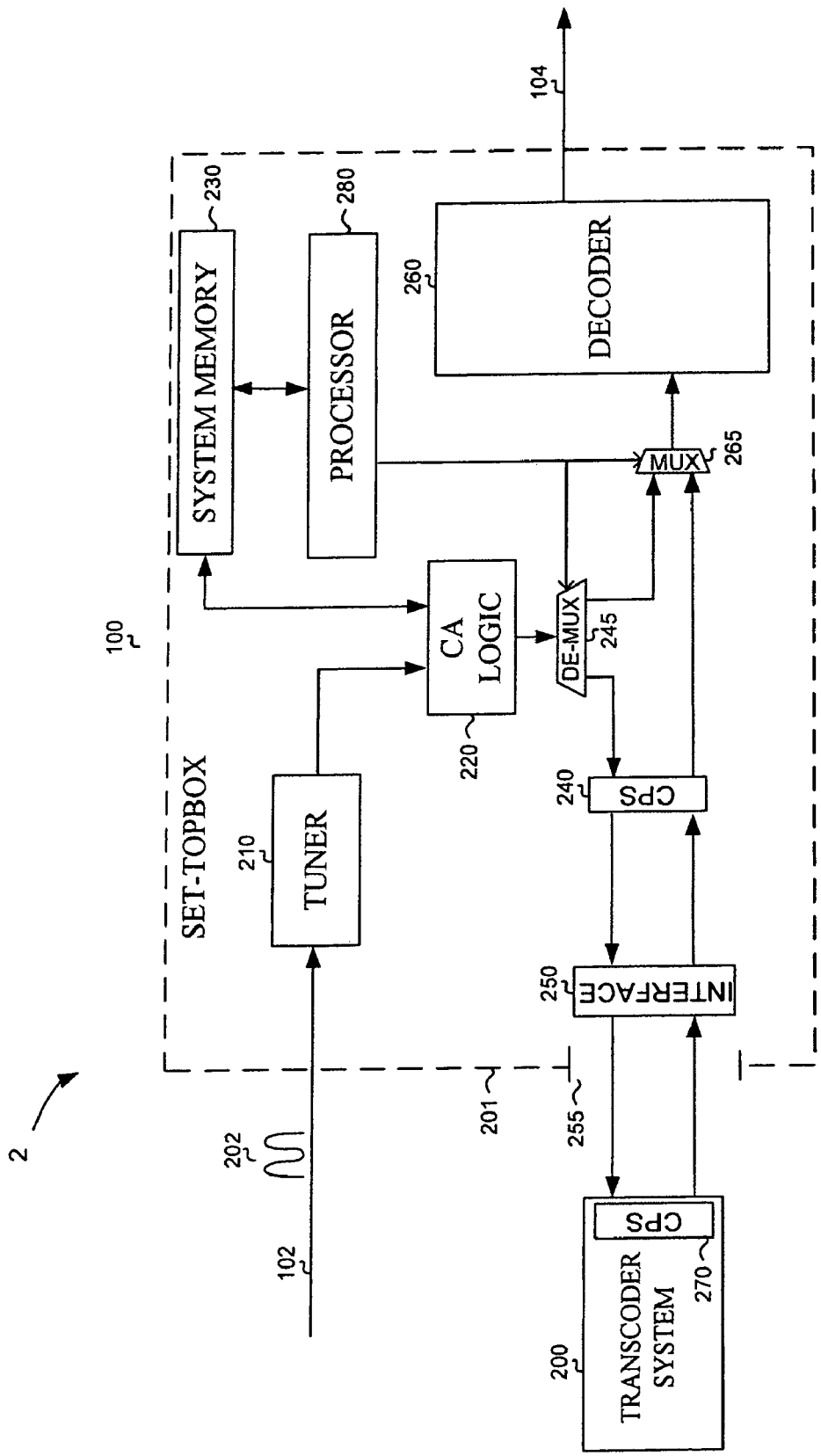
FIG. 2 illustrates an exemplary system in which embodiments of the invention may be practiced.

FIG. 2 illustrates an exemplary system 2 in which embodiments of the invention may be practiced. As shown, the system 2 includes the set-top-box 100 and a transcoder system 200. The set-top-box 100 includes a tuner 210 to receive a signal 202, such as a transport stream, and to adjust the resonant frequency of a receiving antenna (not shown) or transmission line 102 to work most efficiently at one frequency or band of frequencies. The set-top-box 100 also includes conditional access (CA) logic 220 to access the content of the received signal 202 as described in greater detail in conjunction with FIG. 3. In an exemplary embodiment of the invention, the CA logic 220 may be implemented as software stored in a machine-accessible medium that is separate or part of the system memory 230 and executed by a processor 280. Suitably, the processor 280 may include one or more microprocessors, digital signal processors or application specific integrated circuits. The machine-accessible medium includes recordable/non-recordable media (e.g., read only memory (ROM); random access memory (RAM); magnetic disk storage media; optical storage media; flash memory devices; etc.). Suitably, the CA logic 220 is a downloadable or a programmable logic stored in any type of programmable memory, programmable electronic circuit, a semiconductor memory device, a volatile memory (e.g., random access memory, etc.), a non-volatile memory (e.g., read-only memory, flash memory, etc.), an optical disk (e.g., compact disk or digital versatile disc "DVD"), or a hard drive disk.

The set-top-box 100 includes a copy protection system (CPS) 240 to place the conditionally accessed content in a protected format, and an interface 250, such as a Personal Computer Memory Card International Association (PCM-CIA) or Universal Serial Bus (USB) interface for example, to enable communications between the set-top box 100 and the transcoder system 200. As generally shown in FIG. 2, the set-top-box 100 includes a housing 201 with an opening 255 to allow interfacing between the set-top box 100 and the transcoder system 200. In an exemplary embodiment of the invention, the opening 255 is of a size to allow the passage of the transcoder system 200, such as an electronic card, into the housing 201 of the set-top-box 100.

The transcoder system 200 receives accessed content in a protected format from the set-top box 100 via the opening 255 and transcodes the content from a first audio/video encoding standard to a second audio/video encoding standard. As an illustrative example, the transcoder system 200 may convert content from a Motion Picture Expert Group 4 format (MPEG-4 video) into MPEG-2 content. As another illustrative example, the transcoder system 200 may convert MPEG-2 content into MPEG-4 content. As yet another illustrative example, the transcoder system 200 may convert content between an MPEG format and a Joint Photographic Experts Group (JPEG) format. Of course, other transcoding schemes apply.

The transcoder system 200 provides the transcoded content to the set-top box 100 via the opening 255 and the interface 250. It should be noted that in the exemplary embodiment of the invention, the transcoder system 200 lacks any conditional access functionality so the transcoder system 200 cannot conditionally access any signal, such as in the same manner as the CA logic 220. Suitably, the transcoder system 200 includes a copy protection system (CPS) 240 to access the received content with the protected format, and to place the transcoded content in the protected format prior to providing the transcoded content to the set-top box 100, such as in the CPS 240, which then accesses the received content with the protected format and provides the accessed content to the decoder 260.

The decoder 260, such as an MPEG 2 decoder for example, decodes signals received from either of CA logic 220 or the transcoder system 200, and outputs the decoded signal to the viewer's content playback device 105, such as via interconnect 104. A demultiplexer 265 and multiplexer 245 controlled by the processor 280 are also included in the set-top-box 100 to direct the output of the CA logic 220, and to select the inputs to the decoder 260, respectively, as described in greater detail in conjunction with FIG. 3.

Figure 3:
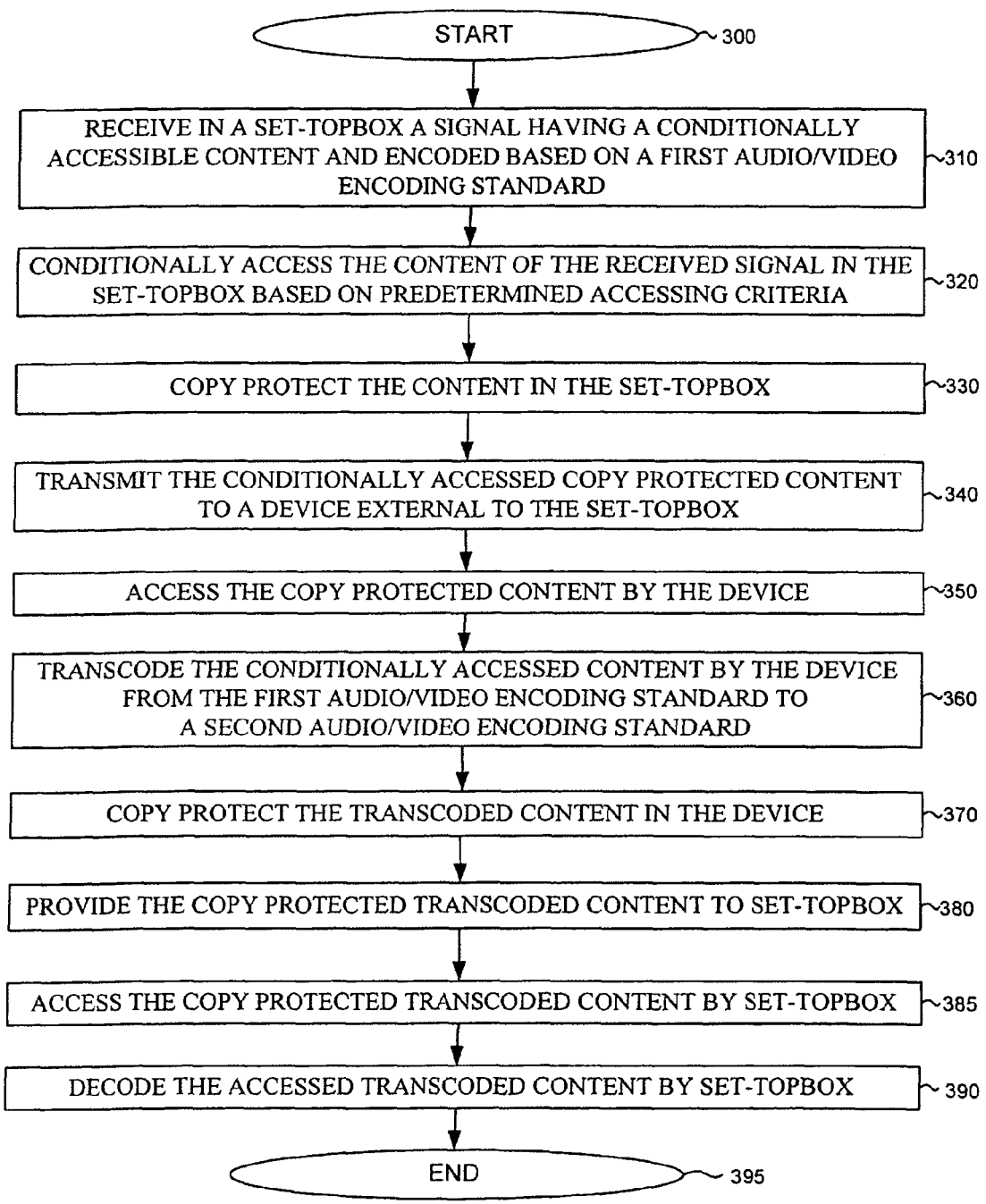
FIG. 3 is a flow chart illustrating an exemplary process according to an exemplary embodiment of the invention.

The overall series of operations of the system 2 shown in FIG. 2 will now be discussed in greater detail in conjunction with the exemplary process of FIG. 3. As shown in FIG. 3, the following the start (block 300), a signal 202 of FIG. 2 having a conditionally accessible content is received in the set-top-box 100. In an exemplary embodiment, signal 202 is encoded based on a first audio/video encoding standard, such as the MPEG-4 encoding standard. Suitably, the signal 202 is received in a tuner 210, which is a device to adjust the resonant frequency of a receiving antenna (not shown) or a transmission line 102 to work most efficiently at one frequency or band of frequencies.

The signal 202 is then forwarded to the condition access (CA) logic 220 in which the content of the received signal 202 is conditionally accessed based on predetermined access criteria, such as an accessing key. In one exemplary embodiment of the invention, the signal 202 is encrypted so that conditionally accessing the content requires a decryption key. In another exemplary embodiment of the invention the signal 202 is scrambled so that conditionally accessing the content requires a descrambling key. In other exemplary embodiments of the invention, the signal 202 may be ciphered or compressed so that conditionally accessing the content requires deciphering or decompressing keys. Suitably, the accessing key is stored in the system memory 230 or other storage medium accessible by the CA logic 220.

The CA logic 220 is also adapted to determine if the audio/video encoding standard used for signal 202 is different than that of the decoder 260. For example, the signal 202 may be formatted in accordance with a first audio/video encoding standard (e.g., MPEG-4), and the decoder 260 may be adapted to decode signals formatted according to a second audio/video encoding standard (e.g., MPEG-2). If the first audio/video encoding standard is the same as the second audio/video encoding standard used by the decoder 260, such as both follow MPEG-2 encoding standards, the accessed content is sent to the decoder 260 for decoding via the demultiplexer 265 and multiplexer 245 controlled by the processor 280, which directs the output of the CA logic 220, and selects the inputs to the decoder 260. If the first audio/video encoding standard differs from the second audio/video encoding standard used by the decoder 260, then the accessed content is sent to the copy protection system (CPS) 240 for copy protecting the content in the set-top-box 100 (block 330). The conditionally accessed copy protected content is then sent to a device external to the set-top-box 100, such as to the transcoder system 200 (block 340), via the interface 250. In an exemplary embodiment, the interface 250 includes a universal serial bus (USB) device.

Once received in the transcoder system 200, the copy protected content is accessed, such as by the copy protection system (CPS) 270 (block 350). The transcoder system 200 then transcodes the conditionally accessed content from its initial audio/video encoding standard, such as MPEG-4, to a second audio/video encoding standard used by the decoder 260, such as MPEG 2 (block 360). It should be noted that in the exemplary embodiment of the invention, the transcoder system 200 lacks any conditional access functionality so transcoder system 200 cannot conditionally access any signal, such as in the same manner as the CA logic 220. The transcoded content are then copy protected by the CPS 270 and provided to the set-top-box 100, such as via the interface 250 (blocks 370, 380). The copy protected transcoded content are then accessed by the CPS 240 and then decoded by the decoder 260 (blocks 385, 390) for transmission to the viewer's content playback device 105, such as a television, shown in FIG. 1. The overall process then ends (block 395).

It should be noted that the various features of the foregoing embodiments were discussed separately for clarity of description only and they can be incorporated in whole or in part into a single embodiment of the invention having all or some of these features.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A method comprising:
   receiving in a set-top-box a signal having a conditionally accessible content and encoded based on a first audio/video encoding scheme;
   conditionally accessing the content of the received signal in the set-top-box based on predetermined access criteria;
   transmitting the conditionally accessed content to a decoder within the set-top box and maintaining the conditionally accessed content entirely within the set-top box if a logic within the set-top box determines that the first audio/video encoding scheme is compatible to a second audio/video encoding scheme supported by the decoder within the set-top-box;
   transmitting the conditionally accessed content to a device external to the set-top-box in lieu of transmitting the conditionally accessed content to the decoder after the logic within the set-top-box determines that the first audio/video encoding scheme is incompatible with the second audio/video encoding scheme supported by the decoder within the set-top-box;
   transcoding the conditionally accessed content by the device from the first audio/video encoding scheme to the second audio/video encoding scheme if the conditionally accessed content is transmitted to the device external to the set-top box; and
   providing the transcoded content back to the set-top-box if the conditionally accessed content is transmitted to the device external to the set-top box.

2. The method of claim 1, further comprising:
   copy protecting the content in the set-top-box prior to transmission to the device.

3. The method of claim 2, further comprising:
   accessing the copy protected content by the device; and
   copy protecting the transcoded content in the device prior to the providing to the set-top-box.

4. The method of claim 1, wherein the device lacks any conditional access functionality.

5. The method of claim 1, wherein the access criteria comprises an access key.

6. The method of claim 1, wherein the received signal includes at least one of an encrypted, encoded, scrambled, ciphered, and compressed signal.

7. The method of claim 1, wherein conditionally accessing the content of the received signal in the set-top-box based on predetermined access criteria includes at least one of a decrypting, decoding, descrambling, deciphering and decompressing the received signal.

8. The method of claim 1, wherein the device external to the set-top-box comprises a transcoder system and the logic is a processor implemented within the set-top-box.

9. A system comprising:
   a set-top box to receive a signal having a conditionally accessible content and encoded based on a first audio/video encoding scheme, the set-top box including a decoder and a conditional accessing logic to conditionally access the content of the received signal based on predetermined access criteria, the conditional accessing logic to maintain the conditionally accessible content within the set-top box and to route the conditionally accessible content to the decoder if the first audio/video encoding scheme is compatible to a second audio/video encoding scheme supported by the decoder; and a transcoder system to receive the conditionally accessed content from the set-top box only when the first audio/video encoding scheme is incompatible with the second audio/video encoding scheme supported by the decoder, to transcode the conditionally accessed content from the first audio/video encoding scheme to a second audio/video encoding scheme, and to provide the transcoded signal to the set-top box.

10. The system of claim 9, wherein the set-top box further comprising:
   a first copy protection system to place the conditionally accessed content in a protected format in the set-top-box prior to the receipt of the conditionally accessed content in the protected format within the transcoder system.

11. The system of claim 10, wherein the transcoder system further comprising:
   a second copy protection system to access the content with the protected format, and to place the transcoded content in the protected format prior to providing the transcoded content to the set-top box.

12. The system of claim 9, wherein the transcoder system lacks any conditional access functionality.

13. The system of claim 9, wherein the access criteria comprises an access key.

14. The system of claim 9, wherein the set-top box further comprising:
   an interface to provide communication between the set-top box and the transcoder system.

15. The system of claim 14, wherein the interface comprises a universal serial bus (USB) device.

16. The system of claim 9, wherein the conditional accessing logic includes at least one of a decrypting logic, decoding logic, descrambling logic, deciphering logic and decompressing logic to conditionally access the received signal.

17. The system of claim 9, wherein the conditional accessing logic is a programmable logic.

18. The system of claim 9, wherein the first audio/video encoding scheme is a first Motion Picture Expert Group (MPEG) standard and the second audio/video encoding scheme is a second MPEG standard.

19. An apparatus comprising:
   a decoder;
   a demultiplexer having a first output coupled to the decoder;
   conditional access logic in communication with an input of the demultiplexer, the conditional access logic to conditionally access content of a received signal based on predetermined access criteria, the received signal including data encoded according to a first audio/video encoding scheme, the conditional accessing logic further determining if the first audio/video encoding scheme is incompatible with a second audio/video encoding scheme supported by the decoder; and
   a housing to contain the decoder, the demultiplexer and the conditional access logic, the housing including an opening adapted to receive a transcoder system that, in communication with the demultiplexer, (i) receives the content from the conditional access logic only after the conditional accessing logic determines that the first audio/video encoding scheme is incompatible with the second audio/video encoding scheme supported by the decoder, (ii) transcodes the content from a first audio/video encoding scheme to a second audio/video encoding scheme, and (iii) returns the content formatted in the second audio/video encoding scheme via the opening for subsequent rendering and display,
   wherein the decoder to receive the content from the conditional access logic via the demultiplexer in lieu of routing the content to the transcoder system when the first audio/video encoding scheme is compatible with the second audio/video encoding scheme supported by the decoder.

20. The apparatus of claim 19 is a set-top box that interfaces with the transcoder system via a universal serial bus (USB) device.

* * * * *